(12) United States Patent
Jacob et al.

(10) Patent No.: US 7,193,018 B2
(45) Date of Patent: Mar. 20, 2007

(54) SLIP-COAT COMPOSITIONS AND POLYMERIC LAMINATES

(75) Inventors: Sunny Jacob, Akron, OH (US); Marvin C. Hill, Hudson, OH (US)

(73) Assignee: Advanced Elastomer Systems, Lp., Akron, OH (US)

(*) Notice: Subject to any disclaimer, the term of this patent is extended or adjusted under 35 U.S.C. 154(b) by 359 days.

(21) Appl. No.: 10/943,307

(22) Filed: Sep. 15, 2004

(65) Prior Publication Data

US 2006/0057412 A1    Mar. 16, 2006

(51) Int. Cl.
*B32B 25/00*    (2006.01)
(52) U.S. Cl. ............... 525/191; 525/192; 525/240; 525/100; 524/313; 524/495; 428/31; 264/174
(58) Field of Classification Search ........... 525/192; 524/313
See application file for complete search history.

(56) References Cited

U.S. PATENT DOCUMENTS

| | | |
|---|---|---|
| 2,972,600 A | 2/1961 | Braidwood |
| 3,287,440 A | 11/1966 | Giller |
| 4,810,752 A | 3/1989 | Bayan |
| 4,978,714 A | 12/1990 | Bayan et al. |
| 5,013,793 A | 5/1991 | Wang et al. |
| 5,021,500 A | 6/1991 | Puydak et al. |
| 5,100,947 A | 3/1992 | Puydak et al. |
| 5,110,685 A | 5/1992 | Cross et al. |
| 5,290,886 A | 3/1994 | Ellul |
| 5,302,463 A | 4/1994 | Murata et al. |
| 5,343,655 A | 9/1994 | Miyakawa et al. |
| 5,378,543 A | 1/1995 | Murata et al. |
| 5,397,832 A | 3/1995 | Ellul |
| 5,424,019 A | 6/1995 | Miyakawa et al. |
| 5,424,135 A | 6/1995 | Murata et al. |
| 5,441,685 A | 8/1995 | Miyakawa et al. |
| 5,447,671 A | 9/1995 | Kato et al. |
| 5,656,693 A | 8/1997 | Ellul et al. |
| 5,936,028 A | 8/1999 | Medsker et al. |
| 5,952,452 A | 9/1999 | Aerts et al. |
| 6,146,739 A | 11/2000 | Itoh et al. |
| 6,437,030 B1 | 8/2002 | Coran et al. |
| 6,451,915 B1 | 9/2002 | Ellul et al. |
| 6,485,663 B1 * | 11/2002 | Dover ................ 264/173.17 |

FOREIGN PATENT DOCUMENTS

| | | |
|---|---|---|
| EP | 472268 A | 2/1992 |
| JP | 2001121973 | 5/2001 |
| WO | WO 01/49488 A | 7/2001 |

* cited by examiner

*Primary Examiner*—James J. Seidleck
*Assistant Examiner*—Gennadiy Mesh

(57) ABSTRACT

A polymeric laminate comprising (A) a substrate, and (B) a slip layer covering at least a portion of said substrate, where the slip layer consists essentially of (i) a polyethylene blend, where said blend includes (a) from about 3 to about 97 percent by weight, based upon the total weight of said blend, of a first polyethylene resin having a weight average molecular weight from 110,000 to about 140,000 and a polydispersity of less than about 12, (b) from about 3 to about 97 percent by weight, based upon the total weight of said blend, of a second polyethylene resin having a weight average molecular weight from 50,000 up to 109,999 and a polydispersity of less than about 12, and (c) from about 0 to about 40 percent by weight, based upon the total weight of said blend, of a third polyethylene resin having a weight average molecular weight from about 20,000 up to 49,999 and polydispersity of less than about 12, with the proviso that said blend includes at least 60 percent, based upon the total weight of said blend, of said first polyethylene and said second polyethylene combined, (ii) from about 2.5 to about 15 parts by weight, per 100 parts by weight of said polyethylene blend, of a propylene polymer or copolymer having propylene units deriving from propylene monomer, and (iii) from about 4.5 to about 20 parts by weight, per 100 parts by weight of said polyethylene blend, of a dynamically vulcanized rubber.

18 Claims, 1 Drawing Sheet

SLIP-COAT COMPOSITIONS AND POLYMERIC LAMINATES

FIELD OF THE INVENTION

Figure 1:
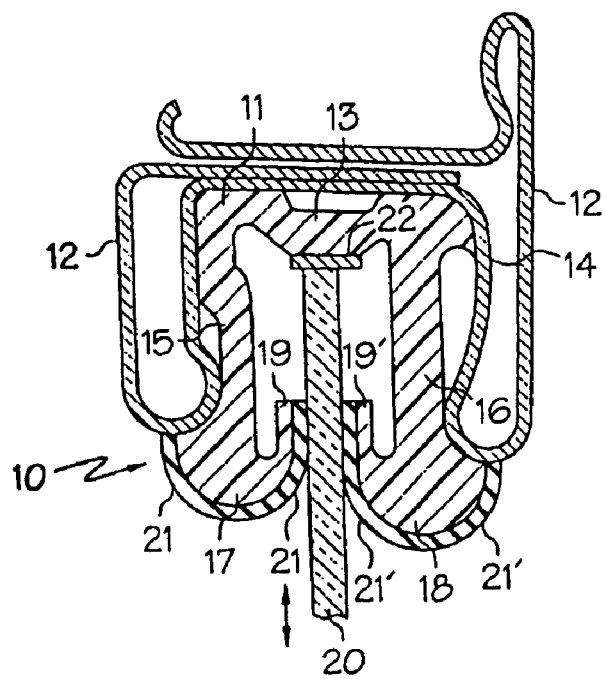
Figure 3:
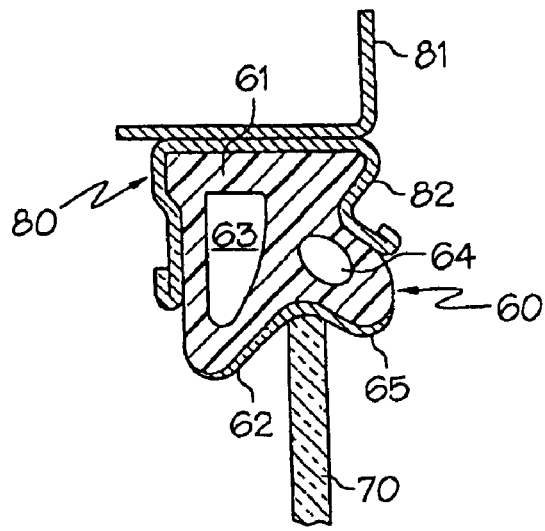
Figure 2:
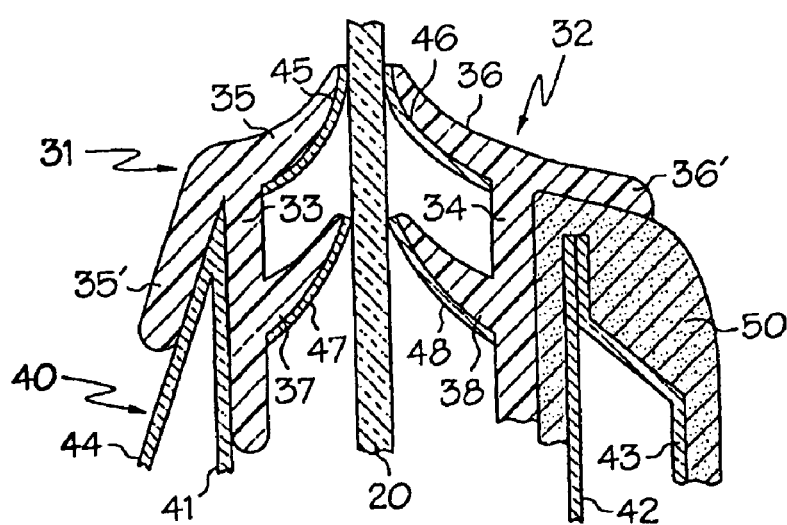

This invention relates to slip-coat compositions and polymeric laminates and weather seals that include these compositions.

BACKGROUND OF THE INVENTION

Window channels are commonly employed to mate glass to a window frame. These window channels are typically soft, resilient materials that provide structural integrity and often advantageously provide an environmental or acoustical seal. As a result, many window channels are referred to as weather seals.

In certain uses, such as in automobiles and the like, the weather seal also provides a surface against which a retractable window can slide and seal. In addition to providing an adequate seal, it is desirable that the weather seal is abrasion resistant and demonstrates a low coefficient friction.

In one instance, window channels are enhanced with a slip coat that may include a polymeric film or layer that is applied over a substrate layer, which is typically a rubbery material. For example, U.S. Pat. No. 5,447,671 teaches a weather seal that includes a contacting layer applied to a substrate. The substrate comprises a resilient and flexible synthetic resin or synthetic rubber, and the contacting layer may include a blend of high molecular weight polyethylene (300,000 g/mol) and ultra-high molecular weight polyethylene (1,300,000 g/mol). This patent suggests that the distinct polyethylene resins result in a rough contacting surface, which ostensibly is believed to reduce friction.

In order to overcome disadvantages that may be associated with the use of ultra-high molecular weight resins, such as ultra-high molecular weight polyethylenes, U.S. Pat. No. 6,146,739 teaches a glass-run channel that includes a contact part that includes a substrate layer and a slide-resin layer. The substrate layer includes a thermoplastic elastomer (e.g., a blend of a rubber and thermoplastic resin), and the slide-resin layer includes an ultra-high molecular weight polyolefin having an intrinsic viscosity of 7 to 40 dl/g as measured in a solvent at 135° C. decalin (which is assumed to include polymers having a weight average molecular weight in excess of about 400,000 g/mol, where the equivalency is based upon an empirical assessment of a range of polymers), a polyolefin having an intrinsic viscosity of 0.1 to 5 dl/g as measured in a solvent at 135° C. decalin, and a thermoplastic elastomer that includes a rubber and a thermoplastic resin.

Despite advancements that have been made thus far in the art, there remains a need to improve weather seals and particularly the slip coatings of the weather seals. In particular, there remains a need to improve the coefficient of friction of these slip coatings as well as the surface characteristics of these coatings such as their appearance.

SUMMARY OF THE INVENTION

In general the present invention provides a polymeric laminate comprising (A) a substrate, and (B) a slip layer covering at least a portion of said substrate, where the slip layer consists essentially of (i) a polyethylene blend, where said blend includes (a) from about 3 to about 97 percent by weight, based upon the total weight of said blend, of a first polyethylene resin having a weight average molecular weight from 110,000 to about 140,000 and a polydispersity of less than about 12, (b) from about 3 to about 97 percent by weight, based upon the total weight of said blend, of a second polyethylene resin having a weight average molecular weight from 50,000 up to 109,999 and a polydispersity of less than about 12, and (c) from about 0 to about 40 percent by weight, based upon the total weight of said blend, of a third polyethylene resin having a weight average molecular weight from about 20,000 up to 49,999 and polydispersity of less than about 12, with the proviso that said blend includes at least 60 percent, based upon the total weight of said blend, of said first polyethylene and said second polyethylene combined, (ii) from about 2.5 to about 15 parts by weight, per 100 parts by weight of said polyethylene blend, of a propylene polymer or copolymer having propylene units deriving from propylene monomer, and (iii) from about 4.5 to about 20 parts by weight, per 100 parts by weight of said polyethylene blend, of a dynamically vulcanized rubber.

The present invention also includes a process for manufacturing a laminate, the process comprising (I) providing a thermoprocessable composition for forming a substrate (II) preparing a thermoprocessable composition for forming a slip coat by (a) dynamically vulcanizing a rubber within a blend that includes the rubber and a propylene polymer or copolymer to form a thermoplastic vulcanizate, and (b) adding, after said step of dynamically vulcanizing the rubber, a blend of polyethylene resins to the thermoplastic vulcanizates, where the polyethylene resin blend consists essentially of (i) from about 3 to about 97 percent by weight, based upon the total weight of said blend, of a first polyethylene resin having a weight average molecular weight of from 110,000 to about 140,000 and a polydispersity of less than about 12, (ii) from about 3 to about 97 percent by weight, based upon the total weight of said blend, of a second polyethylene resin having a weight average molecular weight of from 50,000 up to 109,999 and a polydispersity of less than about 12, and (iii) from about 0 to about 40 percent by weight, based upon the total weight of said blend, of a third polyethylene resin having a weight average molecular weight of from about 20,000 up to 49,999 and polydispersity of less than about 12, with the proviso that said blend includes at least 60 percent, based upon the total weight of said blend, of said first polyethylene and said second polyethylene combined, (III) coextruding the composition for forming the substrate and the composition for forming the slip coat, thereby forming a laminate including a substrate and a slip coat covering at least a portion of the substrate.

The present invention further includes a slip coat composition consisting essentially of (i) a polyethylene blend including (a) from about 3 to about 97 percent by weight, based upon the total weight of said blend, of a first polyethylene resin having a weight average molecular weight of from 110,000 to about 140,000 and a polydispersity of less than about 12, (b) from about 3 to about 97 percent by weight, based upon the total weight of said blend, of a second polyethylene resin having a weight average molecular weight of from 50,000 up to 109,999 and a polydispersity of less than about 12, and (c) from about 0 to about 40 percent by weight, based upon the total weight of said blend, of a third polyethylene resin having a weight average molecular weight of from about 20,000 up to 49,999 and polydispersity of less than about 12, with the proviso that said blend includes at least 60 percent, based upon the total weight of said blend, of said first polyethylene and said second polyethylene combined, (ii) a propylene polymer or copolymer, and (iii) a dynamically-vulcanized rubber.

DETAILED DESCRIPTION OF ILLUSTRATIVE EMBODIMENTS

Laminates of the present invention include a first polymer layer and a second polymer layer. The first polymer layer has a relatively low coefficient of friction. In one embodiment, the laminate forms at least a portion of a weather seal with the first layer forming a slip coat and the second layer forming a substrate on to which the slip is disposed.

The first layer, which may also be referred to as the slip coat or slide layer, includes (i) a polyethylene resin blend including (a) a first polyethylene resin, (b) a second polyethylene resin, and (c) a third polyethylene resin, (ii) a propylene polymer or copolymer, and (iii) a dynamically-vulcanized rubber. While other conventional additives may be included, the slip coat is preferably devoid of ultrahigh molecular weight polyolefins including polyethylene resins that have an intrinsic viscosity in excess of 6 and more preferably in excess of 7 or a number average molecular weight in excess of 500,000 and more preferably in excess of 600,000.

In preferred embodiments, the slip coat or slide layer consists essentially of (i) a polyethylene resin blend including (a) a first polyethylene resin, (b) a second polyethylene resin, and (c) a third polyethylene resin, (ii) a propylene polymer or copolymer, and (iii) a dynamically-vulcanized rubber. Other constituents that may be present in the slip coat include optional fillers, slip aids, oils, processing additives, pigments, low-density polyethylene, and stability-enhancing agents. The phrase "consisting essentially of" limits the scope of constituents within the slip coat composition to those constituents that are specified and those that do not materially affect the basic and novel characteristics of the composition. Particularly excluded by use of this expression are those ultrahigh molecular weight polyolefins, particularly polyethylene. These resins have been found to initiate or create a propensity for stress whitening or creasing.

The rubber employed to form the dynamically-vulcanized rubber is not limited to any one particular rubber. Rubber refers to rubbery polymers or those polymers that exhibit a glass transition temperature ($T_g$) of less than about 0° C., preferably less than about −20° C., and even more preferably less than about −65° C. that are able to undergo dynamic vulcanization.

Useful rubbery polymers preferably contain some degree of unsaturation. Examples of rubbery polymers include olefinic elastomeric copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrin terpolymer rubber, and polychloroprene.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. The preferred α-olefins are propylene, 1-hexene, 1-octene or combinations thereof. The diene monomers may include, but are not limited to, 5-ethylidene-2-norbornene; 1,4-hexadiene; 5-methylene-2-norbornene; 1,6-octadiene; 5-methyl-1,4-hexadiene; 5-vinyl-2-norbornene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

The preferred olefinic elastomeric copolymers include from about 45 to about 85 by weight, more preferably from about 55 to about 75% by weight, still more preferably from about 60 to about 70% by weight, and even more preferably from about 61 to about 66% by weight ethylene units deriving from ethylene monomer, and from about 0 to about 15% by weight, more preferably from about 0.5 to about 12% by weight, still more preferably from about 1 to about 10% by weight, and even more preferably from about 2 to about 8% by weight diene units deriving from diene monomer, with the balance including α-olefin units (preferably propylene) deriving from α-olefin monomer. Expressed in mole percent, the preferred terpolymer preferably includes from about 0.1 to about 5 mole percent, more preferably from about 0.5 to about 4 mole percent, and even more preferably from about 1 to about 2.5 mole percent diene units deriving from diene monomer.

The preferred olefinic elastomeric copolymers have a weight average molecular weight ($M_w$) that is preferably greater than 50,000, more preferably greater than 100,000, even more preferably greater than 200,000, and still more preferably greater than 300,000; and the weight average molecular weight of the preferred olefinic elastomeric copolymers is preferably less than 1,200,000, more preferably less than 1,000,000, still more preferably less than 900,000, and even more preferably less than 800,000. The preferred olefinic elastomeric copolymers have a number average molecular weight ($M_n$) that is preferably greater than 20,000, more preferably greater than 60,000, even more preferably greater than 100,000, and still more preferably greater than 150,000; and the number average molecular weight of the preferred olefinic elastomeric copolymers is preferably less than 500,000, more preferably less than 400,000, still more preferably less than 300,000, and even more preferably less than 250,000.

The preferred olefinic elastomeric copolymers may also be characterized by having a pre-vulcanized Mooney viscosity ($ML_{(1+4)}$ at 125° C.), per ASTM D 1646, of from about 50 to about 500 and preferably from about 75 to about 450. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers is from about 45 to about 80 and preferably from about 50 to about 70.

Useful olefinic elastomeric copolymers may be manufactured or synthesized by using a variety of techniques. For example, these copolymers can be synthesized by employing solution, slurry, or gas phase polymerization techniques that employ numerous catalyst systems including Zeigler-Natta systems, single-site catalysts, and Brookhart catalysts.

Olefinic elastomeric copolymers are commercially available under the tradenames Vistalon™ (ExxonMobil Chemical Co.; Houston, Tex.), Keltan™ (DSM Copolymers; Baton Rouge, La.), Nordel™ IP (DuPont Dow Elastomers; Delaware), NORDEL MG™ (DuPont Dow Elastomers), and Buna™ (Bayer Corp.; Germany).

The rubber is cured by employing dynamic vulcanization techniques. Dynamic vulcanization refers to a vulcanization or curing process for a rubber contained in a blend that includes the rubber and at least one thermoplastic resin. The rubber is vulcanized under conditions of shear and extension at a temperature at or above the melting point of the thermoplastic resin. The rubber is preferably simultaneously crosslinked and dispersed (preferably as fine particles) within the thermoplastic resin matrix, although other morphologies, such as co-continuous morphologies, may exist depending on the degree of cure, the rubber to plastic viscosity ratio, the intensity of mixing, the residence time, and the temperature.

After dynamic vulcanization, and preferably after addition of the polyethylene blend, the rubber is in the form of finely-divided and well-dispersed particles of vulcanized or cured rubber within a continuous thermoplastic phase or matrix, although a co-continuous morphology is also possible. In those embodiments where the cured rubber is in the form of finely-divided and well-dispersed particles within the thermoplastic medium, the rubber particles typically have an average diameter that is less than 50 μm, preferably less than 30 μm, even more preferably less than 10 μm, still more preferably less than 5 μm and even more preferably less than 1 μm. In preferred embodiments, at least 50%, more preferably at least 60%, and even more preferably at least 75% of the particles have an average diameter of less than 5 μm, more preferably less than 2 μm, and even more preferably less than 1 μm.

The rubber within the slip layer is preferably at least partially cured. In one embodiment, the rubber is advantageously completely or fully cured. The degree of cure can be measured by determining the amount of rubber that is extractable from the thermoplastic vulcanizate by using cyclohexane or boiling xylene as an extractant. Preferably, the rubber has a degree of cure where not more than 15 weight percent, preferably not more than 10 weight percent, more preferably not more than 5 weight percent, and still more preferably not more than 3 weight percent is extractable by cyclohexane at 23° C. as described in U.S. Pat. Nos. 4,311,628, 5,100,947 and 5,157,081, which are incorporated herein by reference. Alternatively, the rubber has a degree of cure such that the crosslink density is preferably at least $4\times10^{-5}$, more preferably at least $7\times10^{-5}$, and still more preferably at least $10\times10^{-5}$ moles per milliliter of rubber. See Crosslink Densities and Phase Morphologies in Dynamically Vulcanized TPEs, by Ellul et al., Rubber Chemistry and Technology, Vol 68, pp. 573–584 (1995).

Any curative that is capable of curing or crosslinking the rubber may be used in the dynamic vulcanization. For example, silicon-containing curatives can be employed as disclosed in U.S. Pat. No. 5,936,028, which is incorporated herein by reference. Also, phenolic resins can be employed as disclosed in U.S. Pat. Nos. 2,972,600, 3,287,440, 5,952, 452, and 6,437,030, which are incorporated herein by reference. Peroxide curatives may also be employed as disclosed in U.S. Pat. No. 5,656,693, which is incorporated herein by reference. Where the rubber is a butyl rubber, useful cure systems are described in U.S. Pat. Nos. 5,013, 793, 5,100,947, 5,021,500, 5,100,947, 4,978,714, and 4,810, 752, which are incorporated herein by reference.

In preferred embodiments, the rubber is cured employing a silicon-containing curative. In certain of these embodiments, the rubber is an elastomeric copolymer that includes 5-vinyl-2-norbornene as the diene component. Useful silicon-containing curatives generally include silicon hydride compounds having at least two SiH groups. These compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl) alkanes, bis(dimethylsilyl)benzene, and mixtures thereof.

Preferred silicon hydride compounds may be defined by the formula

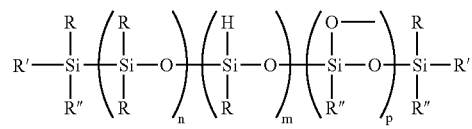

where each R is independently selected from alkyls containing 1 to 20 carbon atoms, cycloalkyls containing 4 to 12 carbon atoms, and aryls, m is an integer having a value ranging from 1 to about 50, n is an integer having a value ranging from 1 to about 50, and p is an integer having a value ranging from 0 to about 6.

As noted above, hydrosilation curing of the elastomeric polymer is preferably conducted in the presence of a catalyst. These catalysts can include, but are not limited to, peroxide catalysts and catalysts including transition metals of Group VIII. These metals include, but are not limited to, palladium, rhodium, and platinum, as well as complexes of these metals. Platinum catalysts are preferred.

The propylene polymers and copolymer include polypropylene homopolymers and copolymers that are formed by polymerizing propylene with one or more of ethylene, 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$–$C_{20}$ diolefins. Comonomer contents for these propylene copolymers will typically be from 1 to about 30% by weight of the polymer. Blends or mixtures of 2 or more polyolefin thermoplastics such as described herein, or with other polymeric modifiers, are also suitable in accordance with this invention. These homopolymers and copolymers may be synthesized by using any polymerization technique known in the art such as, but not limited to, the Phillips-catalyzed reactions, conventional Ziegler-Natta type polymerizations, and catalysis employing single-site organometallic catalysts including, but not limited to, metallocene catalysts.

The preferred propylene polymers and copolymers have a glass transition temperature ($T_g$) of from about −135 to about 110° C., preferably from about −100 to about 50° C., and even more preferably from about −20 to about 20° C. They may also be characterized by a melt temperature that is from about 50° C. to about 180° C., preferably from about 80 to about 180° C., and even more preferably from about 120 to about 180° C. These resins may also be characterized by having a melt flow rate that is from about 0.005 to about 750 decigrams per minute (dg/min), preferably from about 0.01 to about 100 dg/min, and even more preferably from about 0.10 to about 18 dg/min, where the melt flow rate is a measure of how easily a polymer flows under standard pressure per ASTM D-1238 at 230° C. and 2.16 kg load.

Useful propylene polymers and copolymers may also be characterized as semi-crystalline, crystalline, or crystallizable resins. In one embodiment, they have a crystallinity, as measured by differential scanning calorimetry, of from about 10 to about 80%, preferably from about 20 to about 70%, and even more preferably from about 30 to about 65%.

In one embodiment, the propylene polymers and copolymers preferably have a weight average molecular weight ($M_w$) from about 200,000 to about 700,000, and a number average molecular weight ($M_n$) from about 80,000 to about 200,000. More preferably, these resins have a $M_w$ from about 300,000 to about 600,000, and a Mn from about 90,000 to about 150,000.

An especially preferred propylene polymers and copolymers include high-crystallinity isotactic or syndiotactic polypropylene. Preferred polypropylene homopolymers have a density of from about 0.85 to about 0.91 g/cc, with the largely isotactic polypropylene having a density of from about 0.90 to about 0.91 g/cc. Also, high molecular weight polypropylene that has a fractional melt flow rate is preferred. These polypropylene resins are characterized by a melt flow rate that is less than or equal to 10 dg/min and more preferably less than or equal to 1.0 dg/min per ASTM D-1238.

The first polyethylene resin includes polymers having substantially all polymeric units deriving from ethylene. Preferably, at least 90%, more preferably at least 95%, and even more preferably at least 99% of the polymeric units derive from ethylene. In one embodiment, the first polyethylene resin is a polyethylene homopolymer.

The first polyethylene resin may be characterized by having the weight average molecular weight of from 110,000 up to 140,000, optionally from 115,000 to 135,000, and optionally from 120,000 to 130,000, as determined by Gel Permeation Chromatography using polystyrene standards. This first polyethylene resin is also preferably characterized by having a polydispersity that is less than 12, optionally less than 11, optionally less than 10, and optionally less than 9.

In certain embodiments, the first polyethylene resin may also be characterized by having a melt index from 1.0 to 12 dg/min, optionally from 2.0 to 10 dg/min, and optionally from 3.0 to 8.0 dg/min, per ASTM D-1238 at 190° C. and 21.6 kg load.

In certain embodiments, the first polyethylene resin may also be characterized by having an intrinsic viscosity and determined per ASTM D1601 and D 4020 that is from 2.00 up to 5.00 dl/g, optionally from 2.20 to 4.50 dl/g, and optionally from 2.50 to 4.00 dl/g.

The first polyethylene resin may also be characterized by having a density as measured per ASTM D4883 that is greater than 0.93 g/cc, more preferably greater than 0.94 g/cc, and even more preferably greater than 0.95 g/cc.

Polymers useful as the first polyethylene resin are commercially available under the tradename HD7745 (ExxonMobil).

The second polyethylene resin includes polymers having substantially all polymeric units deriving from ethylene. Preferably, at least 90%, more preferably at least 95%, and even more preferably at least 99% of the polymeric units derive from ethylene. In one embodiment, the second polyethylene resin is a polyethylene homopolymer.

The second polyethylene resin may be characterized by having the weight average molecular weight of from 50,000 up to 109,999, optionally from 54,000 to 90,000, and optionally from 58,000 to 70,000. This second polyethylene resin is also preferably characterized by having a polydispersity that is less than 12, optionally less than 11, optionally less than 10, and optionally less than 9.

In certain embodiments, the second polyethylene resin may also be characterized by having a melt index that is from 1.1 up to 14 dg/min, optionally from 1.5 to 13 dg/min, and optionally from 2.0 to about 12 dg/min, per ASTM D-1238 at 190° C. and 2.16 kg load.

In certain embodiments, the second polyethylene resin may also be characterized by having an intrinsic viscosity per ASTM D1601 and D 4020 that is from 1.00 up to 1.99 dl/g, optionally from 1.20 to 1.90 dl/g, and optionally from 1.30 to 1.80 dl/g.

The second polyethylene resin may also be characterized by having a density as measured per ASTM D4883 that is greater than 0.93 g/cc, optionally greater than 0.94 g/cc, and optionally greater than 0.95 g/cc.

Polymers useful as the second polyethylene resin are commercially available under the tradename HD6706 (ExxonMobil).

The third polyethylene resin employed in the slip-coat layer includes a polymer having substantially all of its polymeric units deriving from ethylene. Preferably, at least 90%, more preferably at least 95%, and even more preferably at least 99% of the polymeric units derive from ethylene. In one embodiment, the third polyethylene resin is a polyethylene homopolymer.

The third polyethylene resin may be characterized by having the weight average molecular weight of from 20,000 up to 49,999, optionally from 22,000 to 47,000, and optionally from 26,000 to 45,000. This second polyethylene resin is also preferably characterized by having a polydispersity that is less than 12, optionally less than 11, optionally less than 10, and optionally less than 9.

In certain embodiments, the third polyethylene resin may also be characterized by having a melt index that is from 15 up to 50 dg/min, optionally from 18 to 45 dg/min, and optionally from 20 to 40 dg/min, per ASTM D-1238 at 190° C. and 2.16 kg load.

In certain embodiments, the third polyethylene resin may also be characterized by having an intrinsic viscosity that is from 0.10 up to 0.99 dl/g, optionally from 0.40 to 0.95 dug, and optionally from 0.60 to 0.90 dug per ASTM D1601 and D 4020.

The third polyethylene resin may also be characterized by having a density as measured per ASTM D4883 that is greater than 0.93 g/cc, more preferably greater than 0.94 g/cc, and even more preferably greater than 0.95 g/cc.

Polymers useful as the third polyethylene resin are commercially available under the tradename HD6733 (ExxonMobil).

Fillers that may optionally be included include those reinforcing and non-reinforcing fillers or extenders that are conventionally employed in the compounding of polymeric materials. Useful fillers include carbon black, calcium carbonate, clays, silica, talc, and titanium dioxide.

Plasticizers, extender oils, synthetic processing oils, or a combination thereof may also be optionally added to the blend. The extender oils may include, but are not limited to, aromatic, naphthenic, and paraffinic extender oils. Exemplary synthetic processing oils are polylinear α-olefins, polybranched α-olefins, and hydrogenated polyalphaolefins. The compositions of this invention may include organic esters, alkyl ethers, or combinations thereof. U.S. Pat. Nos. 5,290,886 and 5,397,832 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e. that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective. Synthetic polyalphaolefins are also useful in lowering $T_g$.

Oligomeric extenders may also optionally be used. Preferred oligomeric extenders include copolymers of isobutylene and butene or copolymers of butadiene together with a complementary comonomer. These oligomeric extenders typically have a number average molecular weight of less than 1,000. Useful oligomeric extenders are commercially available. For example, oligomeric copolymers of isobutylene and butene are available under the tradenames Polybutene™ (Soltex; Houston, Tex.), Indopol™ (BP; Great Britain), and Parapol™ (ExxonMobil). Oligomeric copolymers including butadiene are commercially available under the tradename Ricon Resin™ (Ricon Resins, Inc; Grand Junction, Colo.).

Polymeric processing additives may also optionally be added. These processing additives may include polymeric resins that have a very high melt flow index. These polymeric resins include both linear and branched molecules that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives may be used. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

Slip aids may optionally be included in the slip-coat layer. Slip aids may include any material that will enhance or lower the coefficient of friction of the slip-coat layer and that preferably does not have a deleterious impact on the composition. Types of slip aids include siloxane polymers, fatty acids, fatty acid triglycerides, fatty acid amides, esters, fluoropolymers, graphite, molybdenum, silica, boron nitride, silicon carbide, and mixtures thereof.

Useful siloxane polymers include dialkyl polysiloxanes and silicone oils. Useful dialkyl polysiloxanes include dimethyl polysiloxane, phenylmethyl polysiloxane, fluorinated polysiloxanes, tetramethyltetraphenyltrisiloxane and the hydroxy-functionalized polysiloxanes thereof. Preferred siloxane polymers include those having a weight average molecular weight of from about 200 to about 500,000 g/mole, preferably from about 10,000 to about 400,000 g/mole, and more preferably from about 100,000 to about 380,000 g/mole.

Useful fatty acids include those obtained from both animal and plant sources, and include both saturated and unsaturated acids. Exemplary saturated fatty acids include butyric acid, lauric acid, palmitic acid, and stearic acid. Exemplary unsaturated fatty acids include oleic acid, linoleic acid, linolenic acid, and palymitoleic acid. Triglycerides of these fatty acids may also be employed.

Exemplary fatty acid amides include lauramide, palmitamide, stearamide and behenamide; unsaturated fatty acid amides such as erucamide, oleamide, brassidamide and elaidamide; and bisfatty acid amides such as methylenebisstearamide, methylenebisoleamide, ethylenebisstearamide and ethylenebisoleamide.

Useful esters include an ester of cetyl alcohol and acetic acid, an ester of cetyl alcohol and propionic acid, an ester of cetyl alcohol and butyric acid, an ester of beef tallow alcohol and acetic acid, an ester of beef tallow alcohol and propionic acid, an ester of beef tallow alcohol and butyric acid, an ester of stearyl alcohol and acetic acid, an ester of stearyl alcohol and propionic acid, an ester of stearyl alcohol and butyric acid, an ester of distearyl alcohol and phthalic acid, glycerol monooleate, glycerol monostearate, 12-hydroxylated stearates, glycerol tristearate, trimethylolpropane tristearate, pentaerythritol tetrastearate, butyl stearate, isobutyl stearate, stearic acid esters, oleic acid esters, behenic acid esters, calcium soap containing esters, isotridecyl stearate, cetyl palmitate, cetyl stearate, stearyl stearate, behenyl behenate, ethylene glycol montanate, glycerol montanate, pentaerythritol montanate and calcium containing montanic acid esters. Of these, an ester of distearyl alcohol and phthalic acid, glycerol monooleate, glycerol monostearate, stearic acid esters and glycerol montanate are preferred. Especially preferred are an ester of distearyl alcohol and phthalic acid, glycerol monostearate and glycerol montanate.

Useful fluoropolymers include polytetrafluoroethylene and vinylidene fluoride copolymers. In one embodiment, the fluoropolymers are present within the slip-coat layer in the form of finely dispersed particles deriving from fluoropolymer powders. The size of these particles or powders is from about 0.1 µm to about 15 µm and preferably from about 0.2 µm to about 5.0 µm.

Stability-enhancing agents may optionally be included in the first layer. These agents include those commonly employed in the art such as antioxidants, UV stabilizers, antiozonants, and biostats.

The low-density polyethylene may include those polyethylene resins that are generally characterized by having a density as measured per ASTM D4883 that is less than or equal to 0.92 g/cc, more preferably less than 0.91 g/cc, and even more preferably less than 0.90 g/cc.

In one or more embodiments, the preferred low-density polyethylene resins may be characterized by having the weight average molecular weight of from 20,000 up to 49,999, optionally from 22,000 to 47,000, and optionally from 26,000 to 45,000. In one or more embodiments, the low-density polyethylene resin may be characterized by having a polydispersity that is less than 12, more optionally less than 11, optionally less than 10, and optionally less than 9.

In one or more embodiments, the low-density polyethylene resins may be characterized by having a melt index that is from 0.01 up to 50 dg/min, optionally from 1 to 45 dg/min, and optionally from 20 to 40 dg/min, per ASTM D-1238 at 190° C. and 2.16 kg load.

In one or more embodiments, the low-density polyethylene resins may be characterized by having an intrinsic viscosity that is from 0.10 up to 0.99 dl/g, optionally from 0.40 to 0.95 dl/g, and optionally from 0.60 to 0.90 dl/g per ASTM D1601 and D 4020.

The first layer preferably includes from about 45 to about 75% by weight, preferably from about 50 to about 70% by weight, and more preferably from about 55 to about 65% by weight of the polyethylene blend based on the entire weight of the layer.

The polyethylene blend preferably includes from about 3 to about 97, preferably from about 10 to about 60, and more preferably from about 15 to about 50 percent by weight of the first polyethylene resin based on the entire weight of the polyethylene blend.

The polyethylene blend preferably includes from about 3 to about 97, preferably from about 10 to about 80, and more preferably from about 15 to about 70 percent by weight of the second polyethylene resin based on the entire weight of the polyethylene blend.

The polyethylene blend preferably includes from about 0 to about 40, preferably from about 3 to about 30, and more preferably from about 5 to about 25 percent by weight of the third polyethylene resin based on the entire weight of the polyethylene blend.

In preferred embodiments, polyethylene blend includes at least 60%, more preferably at least 65%, and even more preferably at least 70% by weight, based on the entire weight of the blend, of the first and second polyethylene resins combined.

The first layer preferably includes from about 2.5 to about 15 parts by weight, more preferably from about 4 to about 12 parts by weight, and even more preferably from about 6 to about 10 parts by weight propylene polymer or copolymer per 100 parts by weight of the polyethylene blend.

The first layer preferably includes from about 4.5 to about 20 parts by weight, more preferably from about 6 to about 18 parts by weight, and even more preferably from about 8 to about 16 parts by weight dynamically vulcanized rubber per 100 parts by weight of the polyethylene blend.

The first layer preferably includes from about 0 to about 30 parts by weight, more preferably from about 1 to about 20 parts by weight, and even more preferably from about 2 to about 15 parts by weight filler per 100 parts by weight of the polyethylene blend.

The first layer preferably includes from about 0 to about 20 parts by weight, more preferably from about 2 to about 18 parts by weight, and even more preferably from about 3 to about 15 parts by weight oil, extender per 100 parts by weight of the polyethylene blend.

The first layer preferably includes from about 0 to about 20 parts by weight, more preferably from about 1 to about 15 parts by weight, and even more preferably from about 2 to about 12 parts by weight slip aid per 100 parts by weight of the polyethylene blend.

The first layer preferably includes from about 0 to about 10 parts by weight, more preferably from about 0.5 to about 7 parts by weight, and even more preferably from about 1 to about 6 parts by weight polymeric processing additive per 100 parts by weight of the polyethylene blend.

The first layer preferably includes from about 0 to about 5 parts by weight, more preferably from about 0.1 to about 3 parts by weight, and even more preferably from about 0.5 to about 2 parts by weight stability-enhancing agents per 100 parts by weight of the polyethylene blend.

The first layer preferably includes from about 0 to about 10 parts by weight, more preferably from about 0.1 to about 7 parts by weight, and even more preferably from about 1.0 to about 5 parts by weight low-density polyethylene per 100 parts by weight of the polyethylene blend.

In one embodiment, a composition for forming the slip-coat layer is prepared by first forming a thermoplastic vulcanizate feed stock that includes the rubber, which is at least partially cured, and the propylene polymer or copolymer resin. The first, second, and third polyethylene resins are subsequently added to the thermoplastic vulcanizate to form the slip-coat composition. In one embodiment, the slip-coat layer can be prepared by extruding the slip-coat composition, preferably in conjunction with the base layer, by using coextrusion techniques.

The polyethylene resins are preferably added to the thermoplastic vulcanizate feed stock after the rubber has been sufficiently cured to achieve phase inversion. As those skilled in the art appreciate, dynamic vulcanization may begin by including a greater volume fraction of rubber than thermoplastic resin. As such, the thermoplastic resin is present as the discontinuous phase. As dynamic vulcanization proceeds, the viscosity of the rubber increases and phase inversion occurs. In other words, the thermoplastic resin phase becomes continuous. In one embodiment, the rubber becomes a discontinuous phase. In another embodiment, a co-continuous morphology or pseudo co-continuous morphology can be achieved where both the rubber and the thermoplastic resin are continuous phases. In one embodiment, the polyethylene resins are added after about 50%, preferably 75%, and more preferably about 90% of the curative is consumed. In preferred embodiments, the polyethylene resins are added after the curative is completely consumed or full cure has been achieved.

In one embodiment, the polyethylene resins are added while the thermoplastic vulcanizate is in its molten state; that is, the thermoplastic vulcanizate is at a temperature sufficient to achieve flow of the thermoplastic resin phase. Preferably, the thermoplastic vulcanizate is maintained in its molten state from the time of dynamic vulcanization until the polyethylene resins are added.

The addition of the polyethylene resins can occur by using a variety of techniques. In one embodiment, each polyethylene resin is sequentially added to the thermoplastic vulcanizate. In other words, the first polyethylene resin may be added, followed by the second polyethylene resin, and ultimately followed by the third polyethylene resin. The order of addition may vary.

Alternatively, the polyethylene resins may be preblended prior to combining them with the thermoplastic vulcanizate. In one embodiment, the first, second, and third polyethylene resins may be melt blended and subsequently added to the thermoplastic vulcanizate. This subsequent addition after melt blending can occur in the liquid (molten) or solid state. Alternatively, solid forms (e.g., pellets) of the first, second, and third polyethylene resins may be preblended or mixed. The subsequent addition of these premixed pellets or powders can occur in the solid or molten state.

Where the blend of polyethylene resins is added to the thermoplastic vulcanizate in the liquid or molten state, the temperature at which the resins are added is in excess of 150° C., preferably from about 160° C. to about 200° C., and even more preferably from about 170° C. to about 190° C. The liquid or molten addition of the polyethylene resins can occur by employing a variety of techniques. For example, a single or twin-screw extruder can be used to add the polyethylene resins (either individually or as a blend) while in the molten state. In one embodiment, where the thermoplastic vulcanizate is prepared in a continuous extruder process, a side extruder downstream of the vulcanization zone can be used to add molten polyethylene resin.

In those embodiments where the polyethylene resin blend (either individually or as a blend) is added in the solid state, various techniques can be employed to add the solid polyethylene resin to the thermoplastic vulcanizate. For example, crammer feeders or pellet feeders can be employed.

In another embodiment, the polyethylene resin blend (either individually or as a blend) can be added to or combined with the ingredients used to prepare the thermoplastic vulcanizates prior to dynamic vulcanization of the rubber. In other words, dynamic vulcanization takes place in the presence of not only the propylene polymer or copolymer but also the polyethylene resin blend. In those embodiments where the polyethylene resin blend is present during dynamic vulcanization, the rubber preferably includes an ethylene-propylene-5-vinyl-2-norbornene and the curative is preferably a silicon-containing curative.

In one or more embodiments, the slip-coat layer can be characterized by having numerous advantageous properties including a relatively low coefficient of friction, improved surface appearance, improved wear resistance, improved UV stability, and less susceptibility to stress whitening.

In certain embodiments, the slip-coat layer is advantageously characterized by exhibiting a kinetic coefficient of friction, per ASTM D1894-99 on glass at room temperature, of less than 0.20, more advantageously less than 0.19, and even more advantageously less than 0.18.

Likewise, certain embodiments of the slip-coat layer are advantageously characterized by exhibiting a static coefficient of friction per ASTM D1894-99 on glass at room temperature, of less than 0.20, more advantageously less than 0.19, and even more advantageously less than 0.18.

Still further, certain embodiments of the slip-coat layer can be advantageously characterized by exhibiting a Shore D hardness of from about 30 to about 60, advantageously from about 35 to about 50, and more advantageously from about 42 to about 47.

Also, certain embodiments of the slip-coat layer are advantageously characterized by exhibiting an improved surface appearance as demonstrated by relatively low extrusion surface ratings (ESR). ESR can be analyzed as described by Ellul et al., in "Chemical Surface Treatments Of Natural Rubber And EPDM Thermoplastic Elastomers: Effects On Friction And Adhesion," RUBBER CHEMISTRY AND TECHNOLOGY, Vol. 67, No. 4, pg. 582 (1994). Preferably, the slip-coats of certain embodiments of this invention are characterized by having an ESR value (Ra) that is less than 120, advantageously less than 80, and even more advantageously less than 50.

The second layer, which may also be referred to as the substrate or base layer, is preferably prepared from compositions that include at least one polymer characterized by having a glass transition temperature ($T_g$) that is lower than ambient temperature, preferably less than 0° C., more preferably less than –20° C., and even more preferably less than about –65° C. In preferred embodiments, these compositions include at least one rubbery polymer. In one embodiment, these compositions may include one or more rubbery polymers. In other embodiments, these compositions may include one or more block copolymers that include a soft or rubbery segment (i.e., a segment having a glass transition temperature that is less than about 0° C.). In other embodiments, these compositions may include blends of rubbery polymers together with thermoplastic polymers.

Useful rubbery polymers include natural or synthetic rubbery polymers. Synthetic rubbery polymers include homopolymers of one or more conjugated dienes and copolymers of conjugated dienes and vinyl aromatics such as styrene. Other useful rubbery copolymers include copolymers of ethylene, propylene, and diene monomers. The copolymers include both random copolymers (e.g. styrene-butadiene rubber) as well as block copolymer (e.g. styrene-butadiene-styrene block copolymers (S-B-S) and the hydrogenated derivatives thereof (S-E/B-S)). Useful polymeric blends include thermoplastic vulcanizates, which are blends of cured (either fully or partially) rubber and thermoplastic resins. In one embodiment, the thermoplastic vulcanizate includes cured copolymers of ethylene, propylene, and diene monomers dispersed within a continuous poly α-olefin (e.g. polypropylene) phase. In another embodiment, the blends include a poly α-olefin (e.g. polypropylene) and a block copolymer (e.g. S-B-S or S-E/B-S). These may include blends of polyolefin with crosslinkable/crosslinked styrenic block copolymers.

Laminates of this invention can be prepared by employing a variety of techniques. In one embodiment, the slip coat and the substrate are co-extruded to form an integral laminate. In other embodiments, the substrate layer is first prepared by using a variety of techniques including molding or extruding, and then the slip coat is subsequently extruded onto the substrate.

Although the invention is not particularly limited to any particular thicknesses of the first and second layers, the thickness of the slip layer in preferred embodiments is from about 50 μm to about 150 μm, more preferably from about 75 μm to about 125 μm, and even more preferably from about 85 μm to about 115 μm. The thickness of the substrate layer can vary greatly depending on the construction of the laminate or the glass run channel.

In order to demonstrate the practice of the present invention, the following examples have been prepared and tested. The examples should not, however, be viewed as limiting the scope of the invention. The claims will serve to define the invention.

EXAMPLES

Samples 1–5

Comparative polymeric blends that have been used in the prior art as slip coats for polymeric laminates were prepared as Samples 1–3. Specifically, Sample 1 was prepared by blending about 22% by weight of a high-molecular weight polyethylene resin, about 56% by weight of a medium-molecular weight polyethylene resin, and about 22% by weight of a low-molecular weight polyethylene resin. The blend also included about 7% by weight of a carbon black/polyethylene concentrate. This comparative example is similar to that taught by U.S. Pat. No. 5,110,685.

The high-molecular weight polyethylene resin was obtained under the tradename HD™ 7745 (ExxonMobil) and as was characterized by having an intrinsic viscosity of about 2.81 dl/g, a weight average molecular weight of about 125,000, and a melt index of about 0.045 dg/min. The medium-molecular weight polyethylene resin was obtained under the tradename HD™ 6706 (ExxonMobil) and was characterized by having an intrinsic viscosity of about 1.20 dl/g, a weight average molecular weight of about 60,000, and a melt index of about 6.7 dg/min. The low-molecular weight polyethylene resin was obtained under the tradename HD™ 6733 (ExxonMobil) and was characterized by having an intrinsic viscosity of about 0.78 dl/g, a weight average molecular weight of about 40,000, and a melt index of about 33 dg/min. These characteristics, as well as the similar characteristics reported throughout this Experimental Section, were determined as follows. Intrinsic viscosity was determined according to ASTM D1601 and D4020, where the samples were dissolved in decahydronaphthalene at 150° C. and reflux times were measured at 135° C. in triplicate using a Ubbelohde viscometer. The weight average molecular weight was determined by GPC analysis with polystyrene standards using an automatic, heated, self-contained Waters 150 C GPC unit. The melt index was determined according to ASTM D1238 at 190° C. and 2.1 kg load. The carbon black/polyethylene concentrate included about 40% by weight carbon black and about 60% by weight polyethylene that was characterized by a number average molecular weight of 40,000 g/mole and a density that was less than about 0.92 g/cc. This carbon black/polyethylene concentrate was obtained under the tradename AMPACET™ 19470 (Ampacet).

Sample 2 was similar to Sample 1 except that an ethylene-propylene rubber was added. Specifically, the sample included about 30% by weight ethylene-propylene rubber, about 7% by weight of the carbon black/polyethylene concentrate, and about 63% by weight of a polyethylene blend. The polyethylene blend included about 32% by weight of the high-molecular weight polyethylene, about 52% by weight of the medium-molecular weight polyethylene, and about 16% by weight of the low-molecular weight polyethylene based upon the total weight of the polyethylene blend. The high, medium, and low molecular weight polyethylene resins were the same as those employed in Sample 1. The polymeric blend of Sample 2 was likewise similar to that disclosed in U.S. Pat. No. 5,110,685.

Sample 3 included a polymeric blend similar to that disclosed in U.S. Pat. No. 6,146,739. Specifically, the blend included about 61% by weight of a polyethylene blend, about 2% by weight of an amide slip aid, about 2% by weight of a silicone slip aid, about 7% by weight of the carbon black/polyethylene concentrate, and about 28% by weight of a thermoplastic vulcanizate.

The polyethylene blend included about 31% by weight of a high-molecular weight polyethylene resin, about 47% by weight of a medium-molecular weight polyethylene resin, about 12% by weight of a low-molecular weight polyethylene resin, and about 10% by weight of an ultrahigh molecular weight polyethylene resin based upon the total weight of the polyethylene blend. The high, medium, and low molecular weight resins were the same as those employed in Samples 1 and 2. The ultrahigh molecular weight polyethylene resin was characterized by having an intrinsic viscosity of about 12.36 dl/g and a weight average molecular weight of about 1,600,000 g/mole.

The amide slip aid was obtained under the tradename KEMAMIDE™ E, which included about 98% by weight of Erucamide (z-13-docosenamide), and the silicone slip aid was obtained under the tradename MB™ 50-313 (Dow Corning), which includes about 30 to about 60% by weight silicone dispersed within an octene/ethylene polymer.

The thermoplastic vulcanizate was prepared by dynamically vulcanizing a rubber within a blend that included a thermoplastic resin. The dynamic vulcanization procedure was similar to that described in U.S. Pat. No. 4,594,390. The recipe included 190 parts by weight of an oil-extended olefinic elastomeric copolymer (this amount includes 100 parts by weight rubber and 90 parts by weight oil), 64 parts by weight of a thermoplastic polypropylene homopolymer, 174 total parts by weight paraffinic oil (135 parts including the 90 parts inclusive with the rubber), 12 parts by weight clay, 5.3 parts by weight phenolic resin, 2 parts by weight zinc oxide, and 22.6 parts by weight carbon black/polypropylene concentrate (40% by weight carbon black and 60% by weight polypropylene), 1.26 parts by weight stannous chloride. The elastomeric copolymer was poly(ethylene-co-propylene-co-5-ethylidene-2-norbornene) obtained under the tradename VISTALON™ 4779 (ExxonMobil), the thermoplastic polypropylene homopolymer was obtained under the tradename ADSYL 5C 30F (Bassell), the phenolic resin was obtained under the tradename SP-1045, and the carbon black/polypropylene blend was obtained under the tradename Ampacet 49974™ (Ampacet).

These comparative examples are identified in Table I together with various physical and performance properties that were observed from tests that were performed on extrudates of the compositions.

Samples 4 and 5 were prepared in accordance with the teachings of this invention. Specifically, these polymeric blends included about 30% by weight of a thermoplastic vulcanizate together with a polyethylene blend that included a high-molecular weight polyethylene resin, a medium-molecular weight polyethylene resin, and a low-molecular weight polyethylene resin. The high, medium, and low molecular weight polyethylene resins employed in Samples 4 and 5 were the same as those employed in Samples 1–3. Each of the polymeric blends also included about 7% by weight of the carbon black/polyethylene concentrate employed in Samples 1–3. Sample 4 included about 2% by weight of the amide slip aid and about 2% by weight of the silicone slip aid, which were also used in Sample 3. Accordingly, Sample 4 included about 59% by weight of the polyethylene blend, and Sample 5 included about 63% by weight of the polyethylene blend.

The thermoplastic vulcanizates that were employed in Samples 4 and 5 were the same as the thermoplastic vulcanizate employed in Sample 3. This particular thermoplastic vulcanizate is identified as TPV I in this Experimental Section.

TABLE I

| | Samples | | | | |
|---|---|---|---|---|---|
| | 1 | 2 | 3 | 4 | 5 |
| Components (% by weight) | | | | | |
| Polyethylene Blend | 93 | 63 | 61 | 63 | 59 |
| EPR | — | 30 | — | — | — |
| TPV I | 0 | 0 | 28 | 30 | 30 |
| TPV II | 0 | 0 | 0 | 0 | 0 |
| Slip Aid | 0 | 0 | 4 | 0 | 4 |
| Carbon Black/ Polyethylene Concentrate | 7 | 7 | 7 | 7 | 7 |
| Physical/Performance Characteristics | | | | | |
| Specific Gravity | 0.957 | 0.935 | n/a | 0.953 | 0.951 |
| Shore D | 56 | 42 | 47 | 45 | 41 |
| Ultimate Tensile Strength (MPa) | 12.52 | 8.246 | n/a | 19.78 | 7.750 |
| Ultimate Elongation (%) | 100 | 1121 | n/a | 891 | 883 |
| LCR Viscosity | 200 | 283 | n/a | 183 | 146 |
| ESR | 27 | 55 | 130 | 42 | 28 |
| Static COF | 0.125 | 0.214 | 0.146 | 0.178 | N/a |
| Kinetic COF | 0.137 | 0.260 | 0.119 | 0.191 | 0.263 |

Shore hardness was determined according to ISO 868, which is similar to ASTM D-2240. Ultimate tensile strength, ultimate elongation, and 100% modulus were determined according to ISO 527, which is similar to ASTM D-412 at 23° C. by using an Instron testing machine. The extrusion surface roughness (ESR) was determined as described by Ellul et al., in "Chemical Surface Treatments Of Natural Rubber And EPDM Thermoplastic Elastomers: Effects On Friction And Adhesion," RUBBER CHEMISTRY AND TECHNOLOGY, Vol. 67, No. 4, pg. 582 (1994). LCR Viscosity is measured with a Dynisco™ Capillary rheometer at 30:1 length/diameter at $1200s^{-1}$ at 204° C. Static and kinetic COF was determined substantially in accordance with ASTM D1894-99 by using a Thwing-Albert Friction/Peel Tester Model 225.1.

The data in Table I shows that the addition of the thermoplastic vulcanizate to a polymeric blend of three distinct polyethylenes softens that blend, which is advantageous for use as a weather seal. This softening occurs without a deleterious impact on the coefficient friction. Notably, while the addition of ethylene-propylene rubber in Sample 2 softened the polyethylene blend (compared to Example 1), the coefficient of friction deleteriously increased as compared to Sample 4. Also, the data in Table I shows that the absence of the ultra-high molecular weight polyethylene resin provides better surface appearance. Namely, when Samples 3 and 5 are compared, the extrusion surface rating of Sample 3 is markedly higher than Sample 5 yet both samples demonstrate comparable coefficient of friction.

Samples 6–12

Seven additional polymeric blends were prepared and extruded profiles of these blends were tested for various physical and performance properties. As set forth in Table II, the ratio of the various polyethylene components (e.g., the high, medium, and low molecular weight polyethylene resins) was varied. All other constituents within the blends were held at a constant. The values that are provided in Table II for each polyethylene resin are based on a percent by weight of the polyethylene blend component of the composition. The overall polymeric blend included about 62% by weight of the polyethylene blend, 7% by weight of a carbon black/polyethylene concentrate, and 27% by weight of a thermoplastic vulcanizate. The carbon black/polyethylene concentrate was the same as used in Samples 1–5. The thermoplastic vulcanizate, which is designated TPV II, was cured using a silicon-hydride cure system. Specifically, the recipe included 200 parts by weight of an oil-extended olefinic elastomeric copolymer (this amount includes 100 parts by weight rubber and 100 parts by weight oil), 50 parts by weight thermoplastic polypropylene homopolymer, 168 total parts by weight paraffinic oil (160 parts including the 100 parts inclusive with the rubber), 42 parts by weight clay, 2 parts by weight silicon hydride, 0.004017 parts by weight platinum catalyst, 1 part by weight calcium stearate, and 0.5 parts by weight antioxidant. The elastomeric copolymer was poly(ethylene-co-propylene-co-5-vinyl-2-norbornene), which was obtained under the tradename VISTALON™ 1696 (ExxonMobil), the thermoplastic polypropylene homopolymer was obtained under the tradename EQUISTAR™ 51S07A, which was characterized by a melt index of about 0.6–1.0, the silicon hydride was obtained under the tradename 2-5084 (Dow), the platinum catalyst was obtained under the tradename UCT 300 Catalyst (United Chemical Technologies), and the antioxidant was obtained under the tradename IRGANOX™ 1010.

TABLE II

|  | Samples | | | | | | |
| --- | --- | --- | --- | --- | --- | --- | --- |
|  | 6 | 7 | 8 | 9 | 10 | 11 | 12 |
| Polyethylene Blend | | | | | | | |
| High (% of PE blend) | 11 | 11 | 55 | 55 | 55 | 55 | 32 |
| Medium (% of PE blend) | 73 | 52 | 45 | 23 | 11 | 34 | 52 |
| Low (% of PE blend) | 16 | 37 | 0 | 23 | 34 | 11 | 16 |
| Physical/Performance Characteristics | | | | | | | |
| Specific Gravity | 0.964 | 0.963 | 0.965 | 0.963 | 0.965 | n/a | 0.979 |
| Shore D | 44 | 43 | 46 | 44 | 43 | 45 | 44 |
| Ultimate Tensile Strength (MPa) | 11.68 | 11.36 | 22.84 | 20.94 | 17.14 | 18.62 | 7.45 |
| Ultimate Elongation (%) | 882 | 999 | 878 | 828 | 793 | 773 | 885 |
| LCR Viscosity | 163 | 143 | 203 | 178 | 166 | 191 | 171 |
| ESR | n/a | n/a | n/a | n/a | n/a | n/a | 103 |
| Static COF | 0.231 | 0.195 | 0.209 | 0.195 | 0.234 | 0.16 | 0.181 |
| Kinetic COF | 0.226 | 0.239 | 0.204 | 0.243 | 0.283 | 0.174 | 0.170 |

The data in Table II shows that technologically useful slip coats having an advantageous coefficient of friction together with advantageous mechanical properties can be obtained when the high, medium, and low molecular weight resins are employed in amounts consistent with teachings of this invention.

Various modifications and alterations that do not depart from the scope and spirit of this invention will become apparent to those skilled in the art. This invention is not to be duly limited to the illustrative embodiments set forth herein.

What is claimed is:

1. A polymeric laminate comprising:
    (A) a substrate; and
    (B) a slip layer covering at least a portion of said substrate, where the slip layer consists essentially of
        (i) a polyethylene blend, where said blend includes
            (a) from about 3 to about 97 percent by weight, based upon the total weight of said blend, of a first polyethylene resin having a weight average molecular weight from 110,000 to about 140,000 and a polydispersity of less than about 12,
            (b) from about 3 to about 97 percent by weight, based upon the total weight of said blend, of a second polyethylene resin having a weight average molecular weight from 50,000 up to 109,999 and a polydispersity of less than about 12, and (c) from about 0 to about 40 percent by weight, based upon the total weight of said blend, of a third polyethylene resin having a weight average molecular weight from about 20,000 up to 49,999 and polydispersity of less than about 12, with the proviso that said blend includes at least 60 percent, based upon the total weight of said blend, of said first polyethylene and said second polyethylene combined;

(ii) from about 2.5 to about 15 parts by weight, per 100 parts by weight of said polyethylene blend, of a propylene polymer or copolymer having propylene units deriving from propylene monomer; and (iii) from about 4.5 to about 20 parts by weight, per 100 parts by weight of said polyethylene blend, of a dynamically vulcanized rubber.

2. The laminate of claim 1, where said polyethylene blend includes (a) from about 10 to about 60 percent by weight of said first polyethylene resin, (b) from about 10 to about 80 percent by weight of said second polyethylene resin, and (c) from about 3 to about 30 percent by weight of said third polyethylene resin, where the weight percent is based upon the total weight to said polyethylene blend.

3. The laminate of claim 1, where said polyethylene blend includes (a) from about 15 to about 50 percent by weight of said first polyethylene resin, (b) from about 15 to about 70 percent by weight of said second polyethylene resin, and (c) from about 5 to about 25 percent by weight of said third polyethylene resin, where the weight percent is based upon the total weight to said polyethylene blend.

4. The laminate of claim 1, where said slip layer consists essentially of (i) said polyethylene blend; (ii) from about 4 to about 12 parts by weight of said propylene polymer or copolymer; (iii) from about 6 to about 18 parts by weight of said dynamically-vulcanized rubber; (iv) from 0 to about 30 parts by weight of a filler, (v) from 0 to about 20 parts by weight of a slip aid, (vi) from 0 to about 20 parts by weight of an oil, (vii) from 0 to about 10 parts by weight of a polymeric processing additive, (viii) from 0 to about 10 parts by weight of a stability-enhancing agent, and (ix) from 0 to about 10 parts by weight of a low-density polyethylene, each based on 100 parts by weight of the polyethylene blend.

5. The laminate of claim 1, where said slip layer consists essentially of (i) said polyethylene blend; (ii) from about 6 to about 10 parts by weight of said propylene polymer or copolymer; (iii) from about 8 to about 16 parts by weight of said dynamically-vulcanized rubber; (iv) from about 1 to about 20 parts by weight of a filler, (v) from about 1 to about 15 parts by weight of a slip aid, (vi) from about 2 to about 18 parts by weight of an oil, (vii) from about 0.5 to about 7 parts by weight of a polymeric processing additive, (viii) from about 0.1 to about 5 parts by weight of a stability-enhancing agent and (ix) from 0.1 to 7 parts by weight of a low-density polyethylene, each based on 100 parts by weight of the polyethylene blend.

6. The laminate of claim 1, where said first polyethylene resin has an intrinsic viscosity of from 2.00 to about 5.00 dl/g, said second polyethylene resin has an intrinsic viscosity of from 1.00 up to 1.99 dl/g, and said third polyethylene resin has an intrinsic viscosity of from about 0.10 up to 0.99 dl/g.

7. The laminate of claim 1, where said first polyethylene resin has an intrinsic viscosity of from 2.20 to about 4.50 dl/g, said second polyethylene resin has an intrinsic viscosity of from 1.20 up to 1.90 dl/g, and said third polyethylene resin has an intrinsic viscosity of from about 0.40 up to 0.95 dl/g.

8. The laminate of claim 1, where said first polyethylene resin has a melt index of from 1.0 to about 12 dg/min at 21.6 kg load, said second polyethylene resin has a melt index of from 1.1 up to 14 dg/min at 2.16 kg load, and said third polyethylene resin has a melt index of from about 15 up to 50 dg/min at 2.16 kg load per ASTM D-1238.

9. The laminate of claim 1, where said first polyethylene resin has a density that is greater than about 0.93 g/cc, said second polyethylene resin has a density that is greater than about 0.93 g/cc, and said third polyethylene resin has a density that is greater than about 0.93 g/cc.

10. The laminate of claim 1, where said thermoplastic resin is a crystalline or crystallizable polypropylene, and where said dynamically-vulcanized rubber includes a terpolymer of ethylene, propylene, and at least one diene.

11. The laminate of claim 5, where said slip aid is selected from the group consisting of siloxane polymers, fatty acids, fatty acid triglycerides, fatty acid amides, esters, fluoropolymers, graphite, molybdenum, silica, boron nitride, silicon carbide, and mixtures thereof.

12. The laminate of claim 1, where said dynamically-vulcanized rubber is in the form of particles, and where at least 50% of said particles have an average diameter that is less than about 5 microns, and where the rubber has a degree of cure where no more than 15 weight percent of the rubber is extractable.

13. The laminate of claim 10, where said diene includes 5-ethylidene-2-norbornene.

14. The laminate of claim 10, where said diene includes 5-vinyl-2-norbornene.

15. The laminate of claim 14, where the rubber is dynamically vulcanized by using a silicon-containing curative.

16. A weather seal comprising the laminate of claim 1.

17. A process for manufacturing a laminate, the process comprising:

(A) providing a thermoprocessable composition for forming a substrate;

(B) preparing a thermoprocessable composition for forming a slip coat by (a) dynamically vulcanizing a rubber within a blend that includes from about 4.5 to about 20 parts by weight, per 100 parts by weight of a blend of polyethylene resins, of the rubber and from about 2.5 to about 15 parts by weight, per 100 parts by weight of said blend of polyethylene resins, of a propylene polymer or copolymer to form a thermoplastic vulcanizate, and (b) adding, after said step of dynamically vulcanizing the rubber, said blend of polyethylene resins to the thermoplastic vulcanizate, where the polyethylene resin blend consists essentially of:

(i) from about 3 to about 97 percent by weight, based upon the total weight of said blend, of a first polyethylene resin having a weight average molecular weight of from 110,000 to about 140,000 and a polydispersity of less that about 12, (ii) from about 3 to about 97 percent by weight, based upon the total weight of said blend, of a second polyethylene resin having a weight average molecular weight of from 50,000 up to 109,999 and a polydispersity of less than about 12, and (iii) from about 0 to about 40 percent by weight, based upon the total weight of said blend, of a third polyethylene resin having a weight average molecular weight of from 20,000 up to 49,999 and polydispersity of less than about 12, with the proviso that said blend includes at least 60 percent, based upon the total weight of said blend, of said first polyethylene and said second polyethylene combined;

(ii) coextruding the composition for forming the substrate and the composition for forming the slip coat, thereby forming a laminate including a substrate and a slip coat covering at least a portion of the substrate.

18. A slip coat composition consisting essentially of:

(i) A polyethylene blend including
  (a) from about 3 to about 97 percent by weight, based upon the total weight of said blend, of a first polyethylene resin having a weight average molecular weight of from 110,000 to about 140,000 and a polydispersity of less that about 12,
  (b) from about 3 to about 97 percent by weight, based upon the total weight of said blend, of a second polyethylene resin having a weight average molecular weight of from 50,000 up to 109,999 and a polydispersity of less than about 12, and
  (c) from about 0 to about 40 percent by weight, based upon the total weight of said blend, of a third polyethylene resin having a weight average molecular weight of from 20,000 up to 49,999 and polydispersity of less than about 12, with the proviso that said blend includes at least 60 percent, based upon the total weight of said blend, of said first polyethylene and said second polyethylene combined;

(ii) from about 2.5 to about 15 parts by weight, per 100 parts by weight of said polyethylene blend, of a propylene polymer or copolymer; and (iii) from about 4.5 to about 20 parts by weight, per 100 parts by weight of said polyethylene blend, of a dynamically-vulcanized rubber.

* * * * *